(12) United States Patent
Parmar et al.

(10) Patent No.: US 10,971,939 B2
(45) Date of Patent: *Apr. 6, 2021

(54) ADAPTIVE CELL-BALANCING

(71) Applicant: Texas Instruments Incorporated, Dallas, TX (US)

(72) Inventors: Manish Parmar, Bangalore (IN); V V Shyam Prasad, Bangalore (IN); Dipankar Mitra, Bangalore (IN); Mahesh K V, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/788,996

(22) Filed: Feb. 12, 2020

(65) Prior Publication Data

US 2020/0185932 A1 Jun. 11, 2020

Related U.S. Application Data

(63) Continuation of application No. 16/140,181, filed on Sep. 24, 2018, now Pat. No. 10,608,442.

(51) Int. Cl.
*H02J 7/14* (2006.01)
*H01M 10/42* (2006.01)
(Continued)

(52) U.S. Cl.
CPC .......... *H02J 7/0014* (2013.01); *H01M 10/425* (2013.01); *H01M 10/441* (2013.01);
(Continued)

(58) Field of Classification Search
CPC ...... H02J 7/0014; H02J 7/0081; H02J 7/7184; H01M 10/425; H01M 10/441; H01M 2010/4271
(Continued)

(56) References Cited

U.S. PATENT DOCUMENTS 6,081,095 A 6/2000 Tamura et al.
9,577,293 B2 2/2017 Tang et al.
(Continued)

FOREIGN PATENT DOCUMENTS

CN 103840224 A 6/2014
JP 2017229158 A 12/2017

OTHER PUBLICATIONS

Search Report for PCT Application No. PCT/US19/52640, international search report dated Dec. 12, 2019, 1 page.

*Primary Examiner* — Phallaka Kik
(74) *Attorney, Agent, or Firm* — Mark Allen Valetti; Charles A. Brill; Frank D. Cimino

(57) ABSTRACT

A cell balancing system includes sensing circuitry configured to sense a cell voltage of each of a plurality of cells of a battery. Cell balancing circuitry is configured to balance each of the plurality of cells in response to a respective cell balancing command for each of the plurality of cells. A comparison circuit configured to compare the sensed cell voltages for each of the plurality of cells to an adaptive threshold voltage. The comparison circuit generates a respective cell state for each of the plurality of cells to indicate a state of the respective cell voltage for each of the plurality of cells relative to the adaptive threshold voltage. A controller is configured to set the respective cell balancing command for each of the plurality of cells and to adjust the adaptive threshold voltage based on an evaluation of the cell states for the plurality of cells.

17 Claims, 9 Drawing Sheets

(51) Int. Cl.
*H01M 10/44* (2006.01)
*H02J 7/00* (2006.01)

(52) U.S. Cl.
CPC ............... *H02J 7/007184* (2020.01); *H01M 2010/4271* (2013.01)

(58) Field of Classification Search
USPC ....... 320/118, 109, 110, 124, 125, 126, 134, 320/136, 160, 164
See application file for complete search history.

(56) References Cited

U.S. PATENT DOCUMENTS

| | | | |
|---|---|---|---|
| 10,559,963 B2 * | 2/2020 | Nakao | H02J 7/0016 |
| 10,608,442 B1 * | 3/2020 | Parmar | H02J 7/0016 |
| 10,690,725 B2 * | 6/2020 | Diamond | G01R 31/3835 |
| 2004/0263119 A1 | 12/2004 | Meyer et al. | |
| 2006/0071634 A1 | 4/2006 | Meyer et al. | |
| 2006/0091858 A1 | 5/2006 | Johnson et al. | |
| 2008/0233469 A1 | 9/2008 | Drozdz et al. | |
| 2010/0237829 A1 | 9/2010 | Tatebayashi et al. | |
| 2010/0283434 A1 | 11/2010 | Kakiuchi | |
| 2011/0215767 A1 | 9/2011 | Johnson et al. | |
| 2012/0007559 A1 | 1/2012 | Schwartz et al. | |
| 2012/0043994 A1 | 2/2012 | Alvarez Valenzuela et al. | |
| 2012/0161707 A1 | 6/2012 | Kim | |
| 2012/0292987 A1 | 11/2012 | Rutkowski et al. | |
| 2013/0057224 A1 | 3/2013 | Choi et al. | |
| 2013/0187611 A1 | 7/2013 | Suzuki et al. | |
| 2013/0234672 A1 | 9/2013 | Kubota et al. | |
| 2013/0257323 A1 | 10/2013 | Diamond et al. | |
| 2013/0257377 A1 | 10/2013 | Diamond et al. | |
| 2013/0257381 A1 | 10/2013 | Diamond et al. | |
| 2015/0318581 A1 | 11/2015 | Johnson et al. | |
| 2015/0380787 A1 | 12/2015 | Ishii et al. | |
| 2016/0009194 A1 | 1/2016 | Katayama et al. | |
| 2016/0089994 A1 | 3/2016 | Keller et al. | |
| 2019/0023146 A1 | 1/2019 | Lee et al. | |
| 2019/0176803 A1 | 6/2019 | Tabatowski-Bush et al. | |
| 2019/0356142 A1 * | 11/2019 | Meyer | H02J 7/0031 |
| 2020/0099232 A1 * | 3/2020 | Parmar | H02J 7/0014 |

* cited by examiner

ADAPTIVE CELL-BALANCING

CROSS REFERENCE TO RELATED APPLICATIONS

Under 35 U.S.C. § 120, this continuation application claims benefits of and priority to U.S. patent application Ser. No. 16/140,181 (TI-79349), filed on Sep. 24, 2018, the entirety of which are hereby incorporated herein by reference.

TECHNICAL FIELD

This disclosure relates to adaptive cell-balancing of multiple cells in a battery pack.

BACKGROUND

Battery balancing circuits perform balancing of multiple cells in a battery pack to increase capacity and help increase each cell's longevity. A difference of cell voltages is a typical manifestation of unbalance. As an example, cell balancing may be performed to correct such imbalances by discharging higher voltage cells or charging higher voltage cells at a slower rate compared to lower voltage cells, such as bypassing the charging current of the higher voltage cells. Typical bypass currents range from a few milliamps to amperes. In another example, cell balancing may be performed by redistribution of charge among cells, such as by using power converter circuitry.

SUMMARY

In one example, a cell balancing system includes sensing circuitry configured to sense a cell voltage of each of a plurality of cells of a battery. Cell balancing circuitry is configured to balance each of the plurality of cells in response to a respective cell balancing command for each of the plurality of cells. A comparison circuit configured to compare the sensed cell voltages for each of the plurality of cells to an adaptive threshold voltage. The comparison circuit generates a respective cell state for each of the plurality of cells to indicate a state of the respective cell voltage for each of the plurality of cells relative to the adaptive threshold voltage. A controller is configured to set the respective cell balancing command for each of the plurality of cells and to adjust the adaptive threshold voltage based on an evaluation of the cell states for the plurality of cells.

In another example, a battery protector device includes a multiplexer connected to cell input/output (I/O) terminals. The cell I/O terminals are coupled to cell voltages from a plurality of battery cells. The multiplexer provides an output voltage corresponding to the selected cell voltage of each of the input terminals based on a multiplexer input signal. A comparator is coupled to the output voltage of the multiplexer and an adaptive threshold voltage. The comparator provides cell states of the cell voltages based on a comparison of the output voltage to the adaptive threshold voltage. A controller is configured to adjust the adaptive threshold voltage based on the cell states of the cell voltages. The controller is configured to set a cell balancing command to balance the plurality of battery cells if at least one cell state is above the adaptive threshold voltage and at least one of the cell states is below the adaptive threshold voltage. A cell balancer circuit is coupled to the cell I/O terminals. The cell balancer circuit adjusts or bypasses charging current to at least one of the plurality of battery cells in response to the cell balancing command.

In yet another example, a method includes sensing cell voltages of a plurality of battery cells. The method includes comparing the sensed cell voltage of each of the plurality of battery cells to an adaptive threshold voltage to determine a cell state for each of the plurality of battery cells. The method includes adjusting the adaptive threshold voltage based on an evaluation of the cell states of the plurality of battery cells. The method includes providing a cell balancing command to control balancing each of the plurality of battery cells if at least one cell state is above the adaptive threshold voltage and at least one of the cell voltage states is below the adaptive threshold voltage. The method includes balancing a charge of at least one of the plurality of battery cells in response to the cell balancing command.

DETAILED DESCRIPTION

Figure 1:
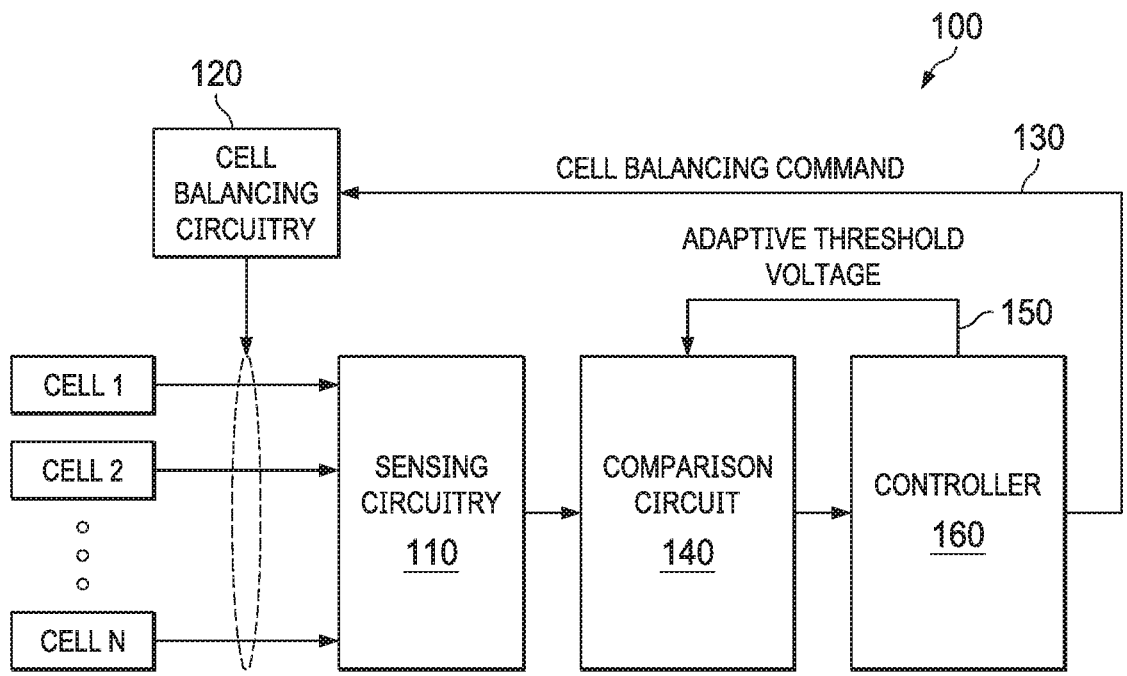
FIG. 1 illustrates an example block diagram of an adaptive cell balancing system.

This disclosure relates to an adaptive cell-balancing among multiple battery cells in a battery pack. Examples are described herein to sense and store battery cell voltage information. This cell voltage information for the cells is evaluated with respect to an adaptive threshold voltage as well as with respect to each other to control cell balancing. The adaptive threshold voltage can be implemented as a programmable voltage that is adjusted (e.g., up or down) based on the evaluation. In another example, the adaptive threshold voltage may be implemented as a windowing threshold that includes high and low threshold voltages that are adjusted based on the evaluation. The adaptive threshold voltage can be adjusted between predetermined first and second (e.g., maximum and minimum) voltages. By adjusting the adaptive threshold voltage across a range versus a fixed threshold, and evaluating cells with respect to the adaptive threshold, cell imbalances can be controlled within a tighter charging window than fixed threshold systems and thus mitigates long charging cycles of weaker cells.

Technical problems exist with current fixed-threshold cell balancing systems. By using a fixed-threshold to determine if a particular cell should be balanced, multiple cells of a battery pack can drift several volts apart from each other before one of the cells of the pack reaches the fixed threshold. Since cells are not balanced until the detected condition with respect to the fixed threshold, one battery cell of the battery pack may be forced to endure long charge and discharge cycles since cell balancing of stronger members may not occur until as wide gape between battery pack members has occurred. The adaptive-threshold solutions described herein provides a technical solution to the fixed threshold problem by dynamically moving the threshold during cell balancing. For example, the adaptive threshold may be moved closer to a strongest member of a battery cell group (e.g., the battery cell with the highest voltage) to allow cell balancing to occur for the stronger battery pack member if it has drifted a significant distance away from one or more weaker members. Also, since each cell of the battery pack is evaluated as a group, differences between individual cell voltages can be reduced (e.g., fewer volts separating strongest and weakest battery cells) which advantageously reduces stress on weaker members and helps to increase the life of the battery pack.

For example, the cell voltage information is processed to determine differential voltage levels of the battery cells and with respect to each other. If any two or more battery cells are mismatched by more than a programmable voltage setting (e.g., a threshold, a window), cell balancing is enabled for one or more battery cells where output devices connected across the cells are activated to divert charging current from the cells. The approach disclosed herein utilizes an adaptive threshold-based voltage comparator which can reduce the need for an expensive ADC to read cell voltages. A voltage sensing stage senses each cell voltage and level shifts it to lower voltage levels in a pre-determined timing sequence driven by digital control signals. The level shifted voltage of each battery cell is passed through the comparator that is configured to compare each battery voltage (e.g., for a given IC chip) at various adaptive threshold voltages which allows cell balancing to occur for all members of the battery pack within a tighter charging window. This helps to reduce the difference between cell voltages in the battery pack and, in turn, increase the overall life of the battery pack.

The adaptive threshold voltages can be set by a digital to analog converter (DAC) based on command bits issued by the controller. The comparator output decides whether each cell is above or below the adaptive threshold voltage for a given threshold setting. This represents the value of each cell's voltage relative to the adaptive threshold voltage, which is de-multiplexed and evaluated to determine compare states among cells. The controller processes this state information to decide which particular cell or cells are to be balanced. For example, the controller generates cell balancing control signals that are provided to a driver to perform balancing. As used herein, the term cell balancing refers to a state where a switch device in the cell-balancer circuit is activated in cell-balancing mode to divert charge current away from a respective cell that is being balanced. When a given switch device is inactive, its associated cell is not in cell balancing mode, such that the associated cell receives full charging current.

In some examples, existing systems for cell balancing utilize fixed thresholds, which systems tend to be inefficient as cell balancing does not operate below the fixed threshold and therefore causes weaker battery cells to traverse through multiple long charge and discharge cycles—which can make the cell even weaker. In contrast, the adaptive threshold balancing as described herein can cover the entire battery voltage range and help optimize the cell balancing by reducing long charge-discharge cycles for weaker cells. Since cells are charged and discharged in relation to other cells in the stack, as opposed to individually with respect to a fixed threshold, this mitigates cells from drifting too far in range from each other which shortens charge and discharge cycles of weaker cell members.

As used herein, the term "circuit" can include a collection of active and/or passive elements that perform a circuit function, such as an analog circuit or digital circuit. Additionally or alternatively, for example, the term "circuit" can include an IC where all or some of the circuit elements are fabricated on a common substrate (e.g., semiconductor substrate, such as a die or chip), such as disclosed herein. For example, each battery protector may be implemented as a respective IC chip, which includes the adaptive threshold cell balancing circuitry.

FIG. 1 illustrates an example of an adaptive cell balancing system 100 (also referred to as cell balancing system). The adaptive cell balancing system 100 includes sensing circuitry 110 configured to sense a cell voltage of each of a plurality of cells of a battery shown as cells 1 through N, with N being a positive integer. Cell balancing circuitry 120 is configured to balance each of the plurality of cells in response to a respective cell balancing command 130 for each of the plurality of cells. In some examples, cell balancing can include a switch device in the cell balancing circuitry 120 that is activated (e.g., switch enabled) in cell-balancing mode to divert charge current away from (e.g., bypass) a respective battery cell that is to be balanced. When the switch device is inactive (e.g., switch disabled) and not in cell balancing mode, the associated cell receives its full charging current from a power source (not shown). Although switch bypass techniques are described herein for cell-balancing, other methods for cell balancing can be provided such as via capacitor-based shuttle balancing where charge is transferred from one cell to another.

In an example, a comparison circuit 140 is configured to compare the sensed cell voltages for each of the plurality of cells 1-N to an adaptive threshold voltage. The comparison circuit 140 generates a respective cell state for each of the plurality of cells to indicate a condition of the respective cell voltage for each of the plurality of cells relative to the adaptive threshold voltage 150. As used herein, the term cell state refers to a logic value that indicates whether or not a given cell's voltage is above or below the adaptive threshold voltages described herein. For example, a logic 1 cell state can represent detected cell voltages above the adaptive threshold voltage whereas a logic 0 cell state can represent detected cell voltages below the adaptive threshold.

A controller 160 is configured to set the respective cell balancing command 130 for each of the plurality of cells 1-N. For example, the controller 160 provides the cell balancing command to set cell balancing switches on or off depending on state of each cell with respect to other cells in a corresponding cell group. As used herein, the term cell group refers to a set of battery cells (e.g., five cells connected in series) that are monitored and cell-balanced with respect to adaptive threshold voltages by the systems and devices described herein. The controller 160 is also configured to adjust the adaptive threshold voltage 150 based on an evaluation of the cell states for each of the plurality of cells.

By way of example, the controller 160 can be configured to set the respective cell balancing command 130 to activate cell balancing (e.g., turn cell balancing switch on) for a given cell of the plurality of cells based on the cell state for the given cell and the cell state of one or more other cells in the plurality of cells 1-N with respect to the adaptive threshold voltage 150. In an example, the controller 160 can be configured to set the respective cell balancing command 130 to activate cell balancing for each cell 1-N having a voltage that resides above the adaptive threshold voltage 150 if at least one of the cell states via the comparison circuit 140 indicates at least one cell voltage is below the adaptive threshold voltage. Also, the controller 160 can be configured to set the respective cell balancing command to deactivate cell balancing (e.g., turn cell balancing switch off) for the given cell of the plurality of cells based on the cell state of each of the plurality of cells 1-N.

The controller 160 can be configured to adjust the adaptive threshold voltage 150 based on an evaluation of the cell states. In an example, the controller 160 is configured to increase the adaptive threshold voltage 150 in response to determining each cell is above the adaptive threshold voltage. For example, the controller 160 can increase the adaptive threshold voltage 150 (e.g., in incremental voltage steps) up to a predetermined maximum voltage if all cell states indicate each cell is above the adaptive threshold voltage. Similarly, the controller 160 can decrease the adaptive threshold voltage 150 in decremental voltage steps down to a predetermined minimum voltage if all cell states indicate each cell is below the adaptive threshold voltage. In this manner, cells can be incrementally charged and balanced as a cell group while mitigating weaker cells from going through long charge and discharge cycles since all cell members are charged with respect to the adaptive threshold voltage 150 that keeps cell voltages clustered in tighter windows as opposed to a fixed threshold.

In an example, the adaptive threshold voltage 150 may be implemented as including multiple thresholds, such as first and second thresholds spaced apart by a predetermined voltage step (e.g., a first and second thresholds separated by a predetermined window voltage). For example, the multiple thresholds include a high and low threshold that form an adaptive window that is adjusted based on an evaluation of cell voltages for a given subset of cells relative to each of the thresholds. Such window facilitates a tighter range of cell balancing and charge cycles which further reduces stress on weaker cells.

By way of example, the adaptive threshold voltage 150 includes first and second threshold voltages separated from each other by a window voltage (e.g., 50 mV, 100 mV, 150 mV). The cell voltage for each of the plurality of cells 150 is compared to the first threshold to determine a first cell state for each respective cell and compared to the second threshold voltage to determine a second cell state for each respective cell. The controller 160 can be configured to enable cell balancing for at least one cell in response to the first cell state for at least one cell indicating that a cell voltage for the at least one cell is above the first threshold voltage and the second cell state for at least another cell indicating that the cell voltage for the at least another cell for the plurality of cells is below the second threshold voltage. In another example, the controller 160 can be configured to increment each of the first and second threshold voltages by a step voltage if each of the cell states for the plurality of cells indicates each of the cells is above the first threshold voltage. Also, the controller 160 can be configured to decrement each of the first and second threshold voltages by the step voltage if each of the cell states for the plurality of cells indicates each of the cells is below the second threshold voltage. The step voltage described herein can be made programmable (e.g., in 50 mV steps). In some cases, the step voltage is set equal to the window voltage.

The adaptive cell balancing system 100 can be implemented as a battery protector system, for example, that includes a plurality of battery protectors (see e.g., FIG. 6) in a stacked configuration where a set of cells are connected to each of the battery protectors and each of the battery protectors comprising the adaptive cell balancing system 100. In another example, the adaptive cell balancing system 100 can be implemented as a battery pack and each of the battery protectors described herein can be implemented as an integrated circuit (IC) chip.

Figure 2:
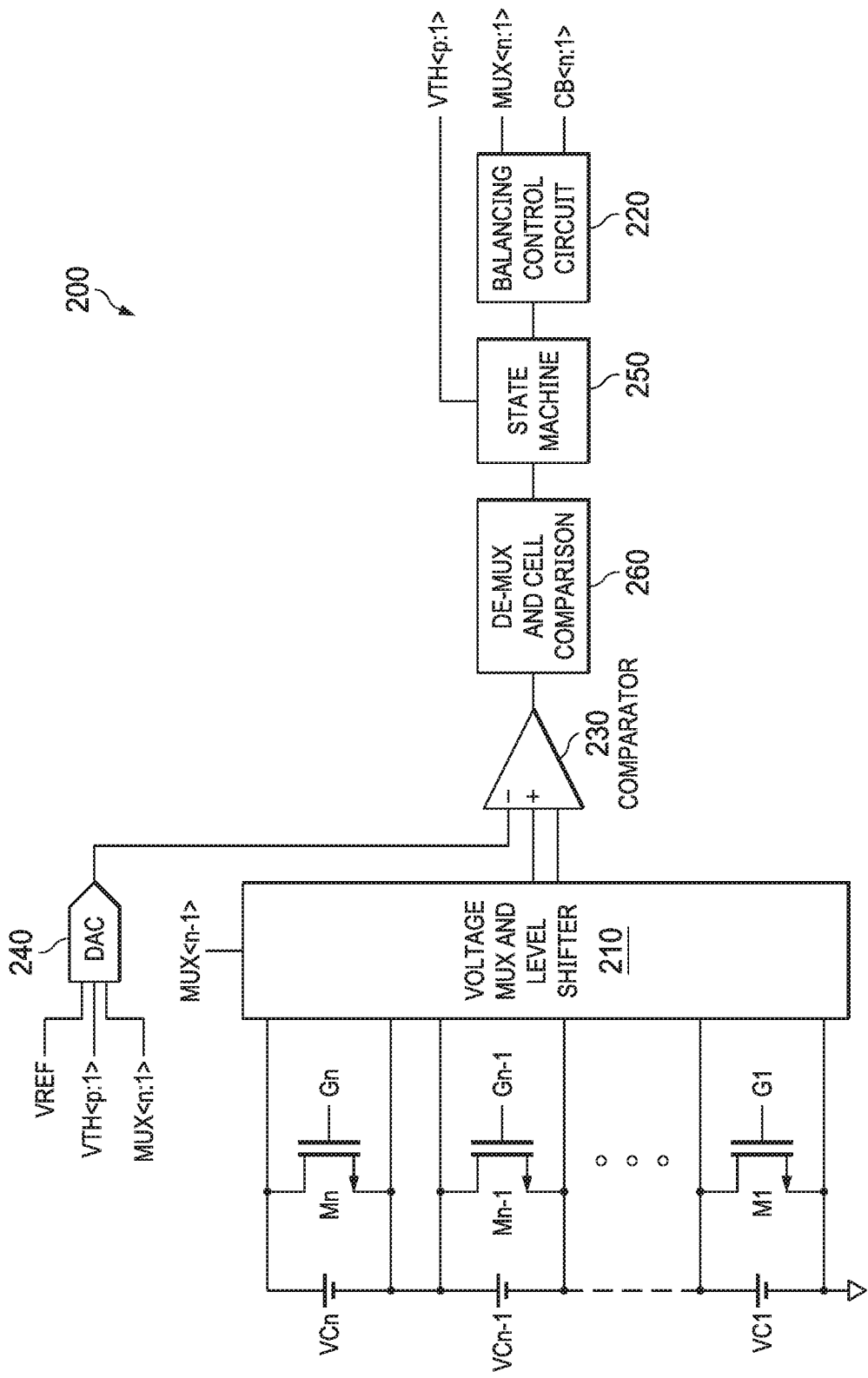
FIG. 2 illustrates an example circuit diagram of an adaptive cell balancing device.

FIG. 2 illustrates an example circuit for an adaptive cell balancing system 200. A voltage multiplexer 210 (MUX) (e.g., shown as sensing circuit in FIG. 1) is configured to sense each cell voltage VC1 through VCN, with N being a positive integer, and level shift it to low voltage levels in a pre-determined timing sequence driven by digital signals MUX<n:1> control provided by a balancing control circuit 220. The level shifted voltage of each battery cell VC1-VCN is provided to an input of a comparator 230 (e.g., corresponding to comparison circuit 140 of FIG. 1). The comparator 230 is configured to compare each battery voltage, as provided by voltage multiplexer 210, with respect to an adaptive threshold voltage set by DAC 240. For example, the adaptive threshold voltages are set by the DAC 240 with bits Vth<p:1> issued from a state machine 250 acting as a controller. The comparator 230 output evaluates the cell voltage to determine whether each cell is above or below the adaptive threshold set by DAC 240 for given threshold setting. The comparator 230 output is provided to a demultiplexer and cell comparison circuit 260 where each cell state is stored and can be evaluated with other members of the cell group by the state machine 250.

The state machine 250 is configured to process information received from the cell comparison circuit 260 and to determine which particular cell or cells should be balanced. For example, the state machine 250 provides state signals to the balancing control circuit 220 that causes the balancing control circuit 220 to generate control signals CB<n:1> for cell-balancing FETs shown as M1 through MN (e.g., part of cell balancing circuitry 120 of FIG. 1) and sends CB<n:1> to a FET Driver which controls M1-MN, such as illustrated in FIG. 3 below.

Figure 3:
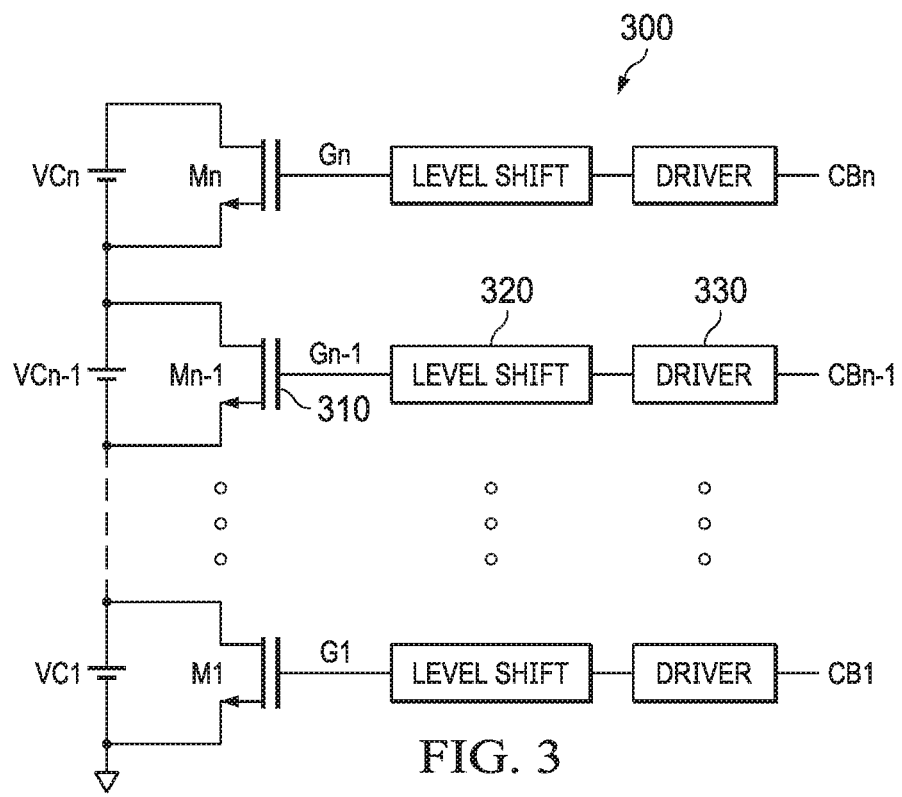
FIG. 3 illustrates an example cell balancing control circuit.

FIG. 3 illustrates an example cell balancing circuit 300 that includes a plurality of cell balancers. Each cell balancer can include a transistor device such as shown at 310 (e.g., FET) to cell balance each cell when cell balancing is enabled by the controller. A level shifter such as shown at 320 can enable or disable the transistor device by its respective gate input based on output from a driver 330. The driver 330 drives the level shifter 320 based on a cell balancing command from the controller. The cell balancing commands are shown as CB1 through CBN, with N being a positive integer, can be generated by the output stage described herein which is in turn receives its input from a controller (see e.g., FIG. 2). The driver 330 is shown in an example illustrated in FIG. 4 described below.

Figure 4:
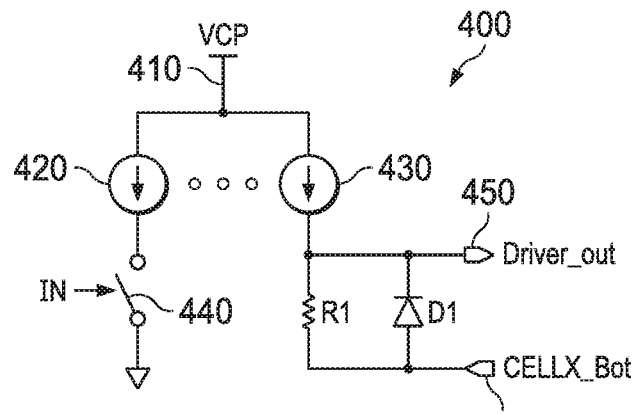
FIG. 4 illustrates an example circuit diagram of a driver employed in the cell balancing control circuit of FIG. 3.

FIG. 4 illustrates an example circuit of a driver 400 employed in the cell balancer of FIG. 3. As shown, the driver 400 can include a charge pump 410 that drives current source 420 and current source 430. Input to the driver 400 can be controlled via switch 440 which diverts current from current source 420 to ground when closed. The switch 440 can be connected to one of the output stage control signals described herein such CB1 through CBN described above with respect to FIG. 3. Current from current source 430 can flow across resistor R1 to develop a voltage at outputs 450 and 460 which can be supplied to a level shifter such as shown in FIG. 3. A diode D1 can be provided for driver protection.

Figure 5:
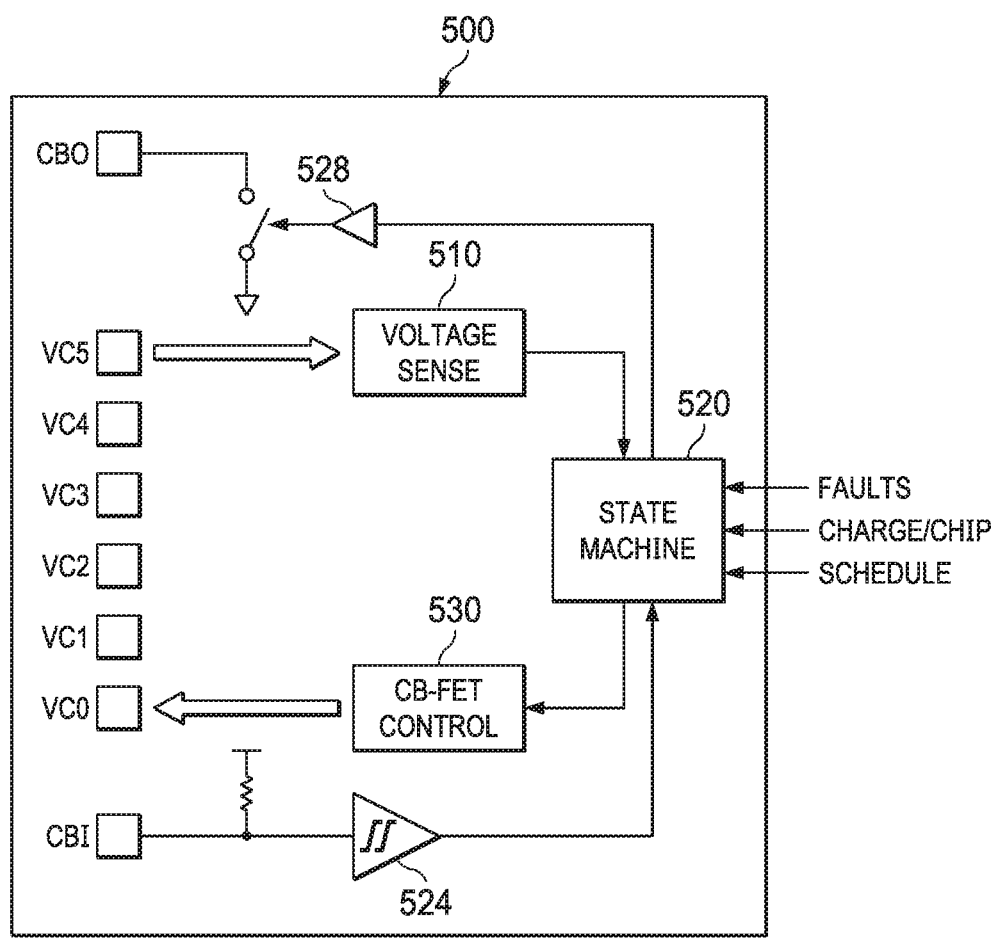
FIG. 5 illustrates an example circuit diagram of an adaptive cell balancing device.

FIG. 5 illustrates an example circuit diagram of an adaptive cell balancing device 500. In this example, the example adaptive cell balancing device 500 includes six I/O pins shown as VC0, VC1, VC2, VC3, VC4, and VC5 to interface and balance three batteries. More or less than six I/O pins can be provided depending on the number of batteries that are supported by a given IC chip in which the adaptive cell balancing device 500 resides. Each of the pins VC0-VC5 are sensed via a voltage sense circuit (e.g., multiplexor, DAC, and comparator) providing an output to a state machine 520 for analysis with respect to an adaptive threshold described herein. The state machine 520 can receive other inputs including fault inputs to disable the state machine, charge/chips controls, and schedule inputs to enable timing windows (e.g., threads) for state machine operations. A cell balancing input (CBI) buffered by driver 524 can be provided to receive cell-balancing enables from other members of a cell-balancing stack (see e.g., FIG. 6) and a cell balancing output (CBO) can be used to enable the next member of the stack via driver 528. A cell-balancing FET-control circuit 530 enables or disables cell-balancing as described herein depending on the relation of sensed cell voltage to the adaptive thresholds described herein.

Figure 6:
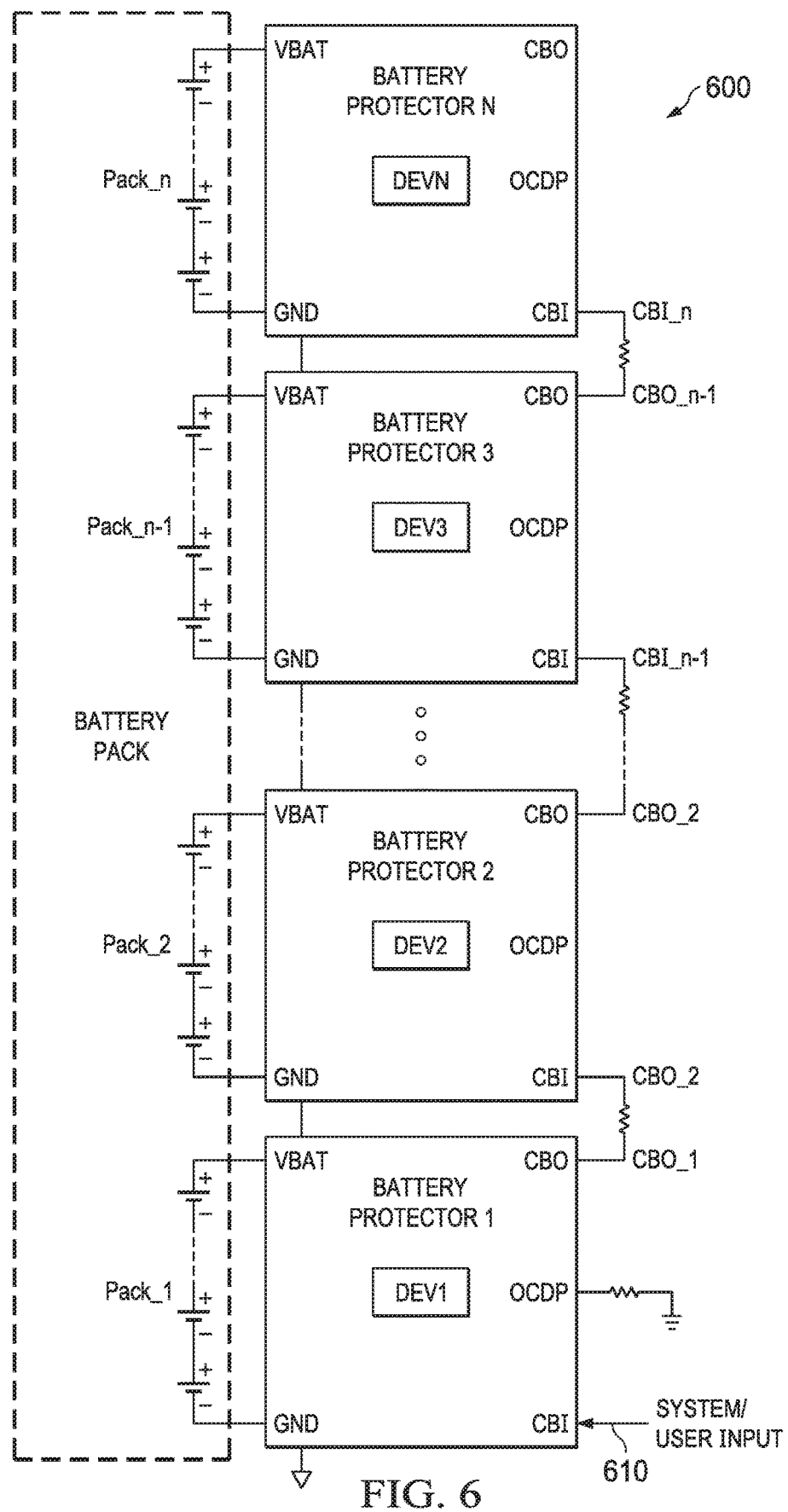
FIG. 6 illustrates an example of a battery system that includes a plurality of battery protectors, each employing an adaptive cell balancing device.

FIG. 6 illustrates an example of a battery protector system 600 employing multiple cell balancing integrated circuit (IC) chips shown as battery protector chips 1 through N with N being a positive integer. Each battery protector chip 1-N includes a respective battery protector device shown as DEV1 through DEVN. As noted previously, each battery protector device 1-N can include a multiplexer connected to cell input/output (I/O) terminals. The cell I/O terminals are coupled to cell voltages from a plurality of battery cells. The multiplexer provides an output voltage corresponding to the cell voltage of each of the input terminals based on a multiplexer input signal. Each battery protector device 1-N also includes a comparator coupled to the output voltage of the multiplexer and an adaptive threshold voltage. The comparator provides cell states of the cell voltages based on a comparison of the output voltage to the adaptive threshold voltage. Each battery protector device 1-N also includes a controller configured to adjust the adaptive threshold voltage based on the cell states of the cell voltages.

The controller is configured to set a cell balancing command to balance the plurality of battery cells with cell state above the adaptive threshold voltage if at least one of the cell states is below the adaptive threshold voltage. The battery protector devices 1-N also include a cell balancer circuit coupled to the cell I/O terminals, the cell balancer circuit adjusts charging current to at least one of the plurality of battery cells in response to the cell balancing command. A switch device can be coupled across each of the plurality of cells, where the controller is configured to control the switch device coupled across each of the at least one cell that is above the adaptive threshold based on the cell balancing command. As shown, the cell balancing output (CBO) of one of the stacked devices in the battery protector system 600 can be used to drive the cell balancing input of a subsequent device higher in the stack. With respect to battery protector device 1, the CBI can be connected to a system input 610 to enable or disable cell balancing for the stack. Each of the battery protectors that are higher in the stack are referenced to the voltage level of the lower members of the stack. Hence, the level shifters as described herein are employed to determined the absolute voltages of a respective cell even though its respective battery protector may not be referenced to ground such as the lowest member battery protector IC 1.

Figure 7:
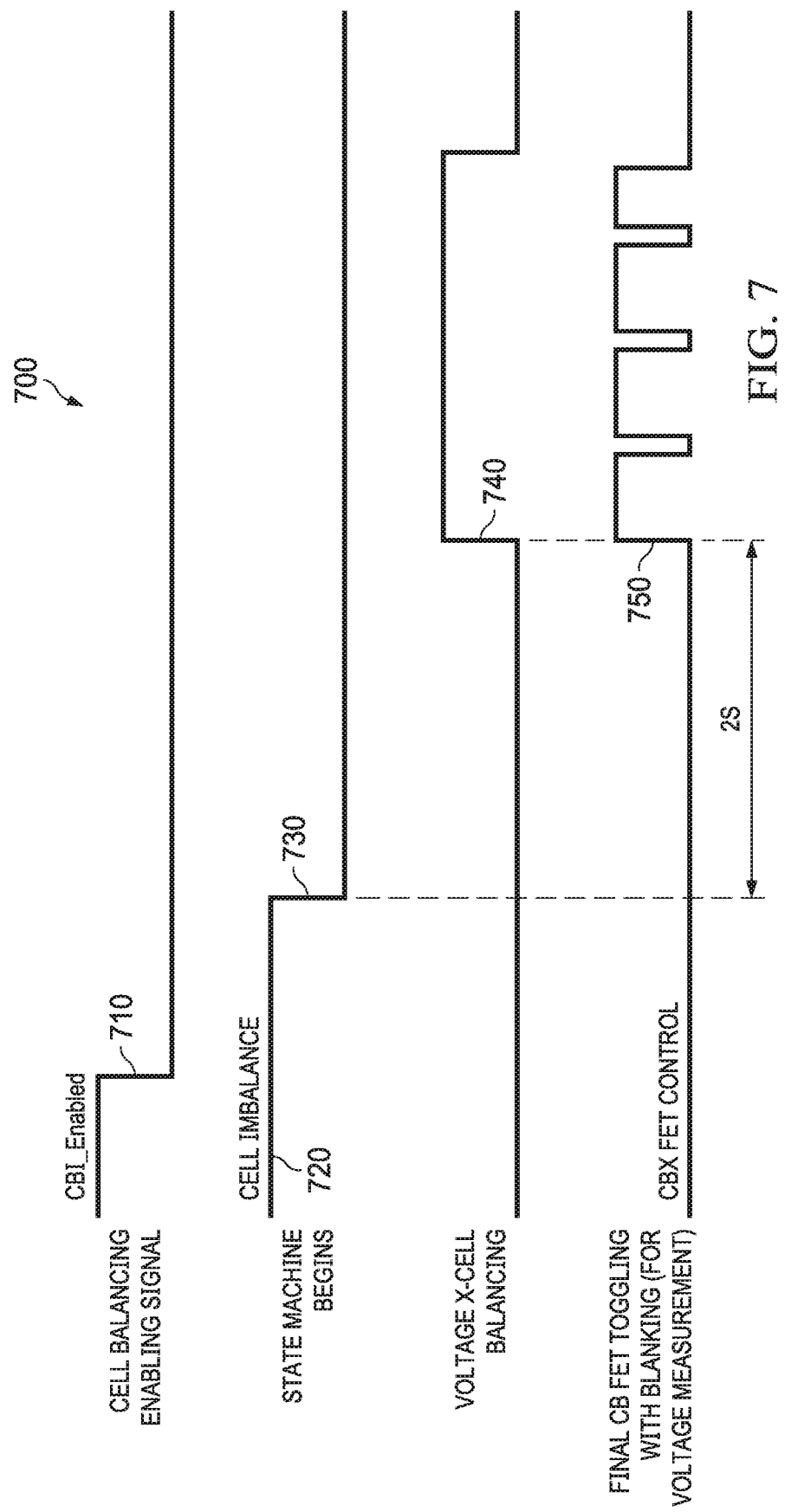
FIG. 7 illustrates an example timing diagram for adaptive cell balancing.

FIG. 7 illustrates an example timing diagram 700 for adaptive cell balancing described herein. At 710, a cell balancing input to the IC's described above with respect to FIGS. 6 and 7 goes low which enables cell balancing for a given IC. A state machine begins to run at 720 where a cell imbalance is detected at 730. Voltage cell balancing evaluation operations (e.g., cell voltage sensing) begins at the falling edge of 730 and continues for about two seconds until 740, where FET control signals are toggled beginning at 750 to balance a given cell as described herein based on a given cell's voltage within a group of cells and with respect to the adaptive threshold (or thresholds) described herein.

Figure 8:
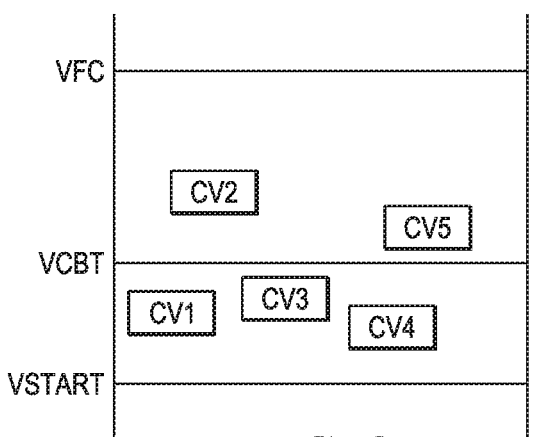
FIGS. 8 and 9 illustrate example cell charging diagrams demonstrating relative cell voltages with respect to a single adaptive threshold voltage.
Figure 9:
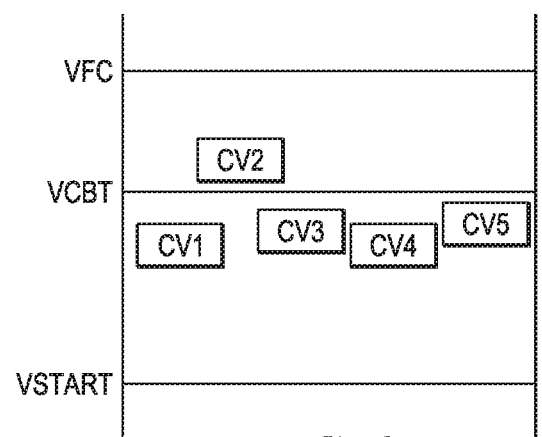

FIGS. 8 and 9 illustrates example cell charging diagrams for an adaptive cell balancing system employing a single adaptive threshold voltage. In an example, cell balancing can be performed by considering a single adaptive voltage threshold value referred to as the cell balancing threshold (CBT). Initially, the CBT applies a VSTART voltage value which is the lowest/minimum possible value of CBT. All the cell voltages are compared with reference to the CBT individually, and, a distribution of all the cell voltages with respect to CBT is arrived at. If there is at least one cell positioned below the CBT such as shown with cell voltages CV1, CV3, and CV4 of FIG. 8, then, cell balancing is turned on for all the cells positioned above CBT which is CV2 and CV5 in this example OF FIG. 8. When there is a distribution of cell voltages where all the cell voltages are greater than the CBT, then CBT is incremented by a STEP voltage value (e.g., 50 mV) such as shown at the increased CBT of FIG. 9. In the example of FIG. 9, cell balancing will be enabled for cell CV2 which is above CBT. The CBT will not be incremented beyond the final charge voltage (VFC) voltage value and will be clamped at the VFC value (maximum cell voltage), if the incremented CBT value goes above VFC. When, there is a distribution of cell voltages, where all the cell voltages are less than the CBT, the CBT is decremented by the STEP value. The CBT will not be decremented below the VSTART voltage value and will be clamped at the VSTART value, if the decremented CBT value goes below VSTART.

Figure 10:
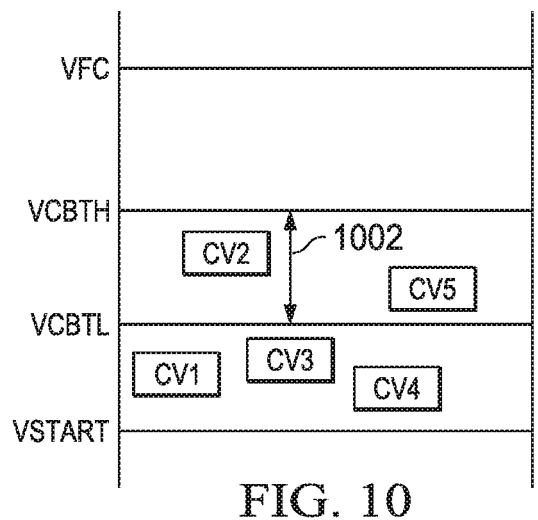
FIGS. 10, 11 and 12 illustrates example cell charging diagrams demonstrating relative cell voltages with respective to multiple adaptive threshold voltages.
Figure 11:
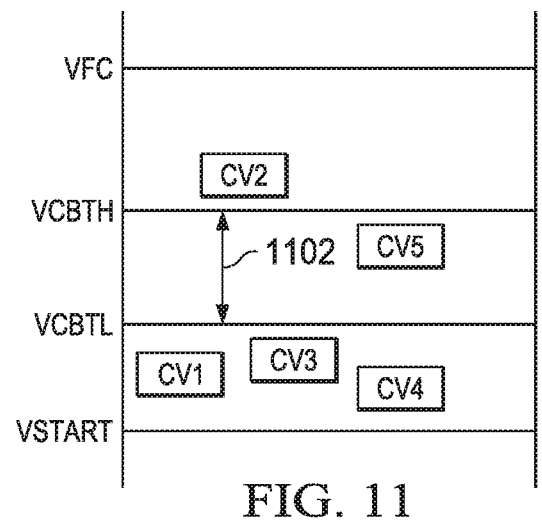
Figure 12:
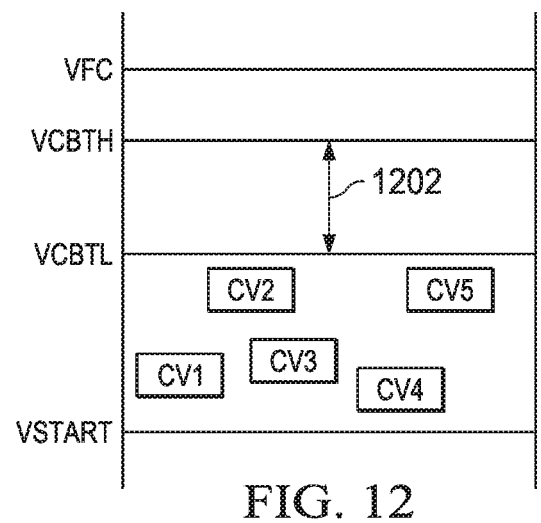

FIGS. 10 through 12 illustrates example cell charging diagrams for an adaptive cell balancing system employing dual adaptive threshold voltages. In these examples, cell balancing can be performed by considering two adaptive voltage threshold values, referred to as cell CBT_H (cell balancing threshold high) and the CBT_L (cell balancing threshold low) which form a window such shown at arrow 1002. The CBT_H and CBT_L are separated by a value of STEP volts with CBT_H being the higher voltage. Initially, the CBT_L takes the VSTART voltage value and the CBT_H takes a voltage value greater by STEP volts. All the cell voltages are compared with reference to the CBT_H and CBT_L individually, and, a distribution of all the cell voltages with respect to CBT_H and CBT_L is arrived at. If there is at least one cell positioned below the CBT_L, then, cell balancing is turned on for all the cells positioned above CBT_H. In the example of FIG. 10, no cells are positioned above CBT_H thus cell balancing is turned off for all cells. In FIG. 11 a window between CBT_L and CBT_H is shown at arrow 1102, where CV2 is above CBT_H, and thus cell balancing is turned on for CV2. When there is a distribution of cell voltages where all the cell voltages are greater than the CBT_H, the CBT_H and CBT_L threshold values are incremented by the STEP value (e.g., 50 millivolts) such shown in FIG. 12 where a window between CBT_L and CBT_H is shown at arrow 1202. The CBT_H will not be incremented beyond the VFC voltage value and will be clamped at the VFC value, if the incremented CBT_H value goes above VFC. When there is a distribution of cell voltages, where all the cell voltages are lesser than the CBT_L, the CBT_H and CBT_L threshold values are decremented by the STEP value. The CBT_L will not be decremented below the VSTART voltage value and will be clamped at the VSTART value, if the decremented CBT_L value goes below VSTART.

Figure 13:
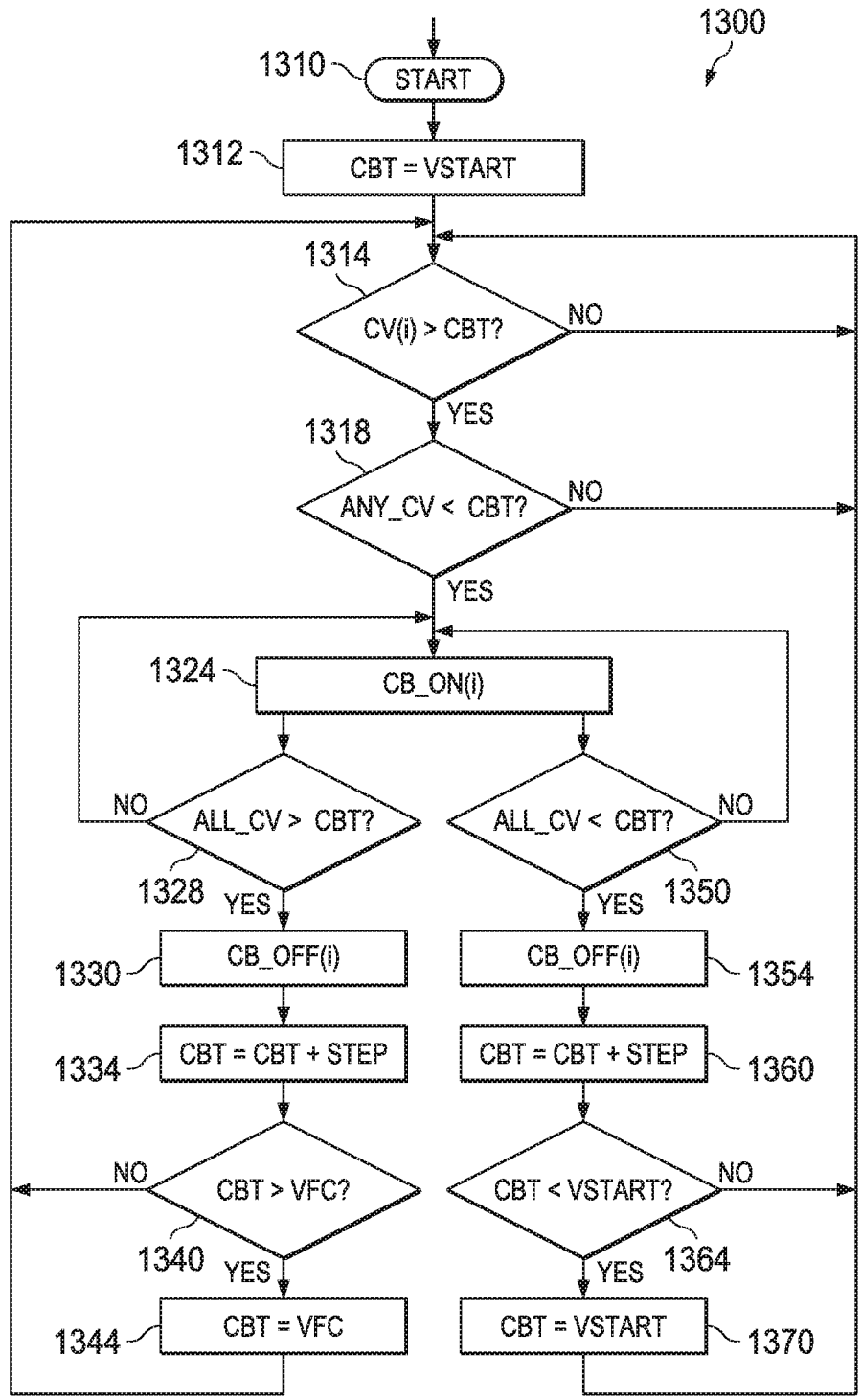
FIG. 13 illustrates an example method for performing single adaptive threshold voltage cell-balancing.
Figure 14:
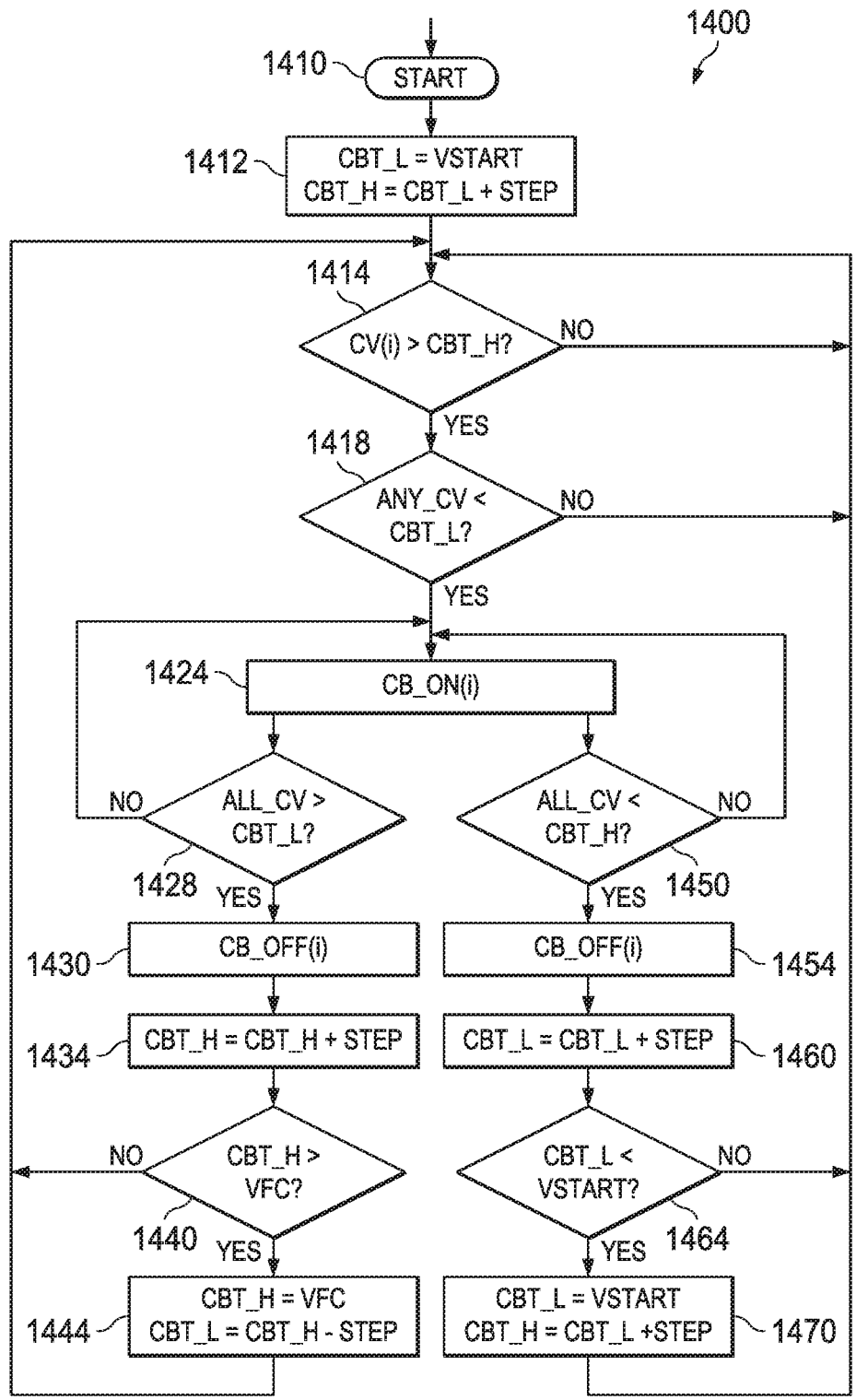
FIG. 14 illustrates an example method for performing dual adaptive threshold voltage cell-balancing.
Figure 15:
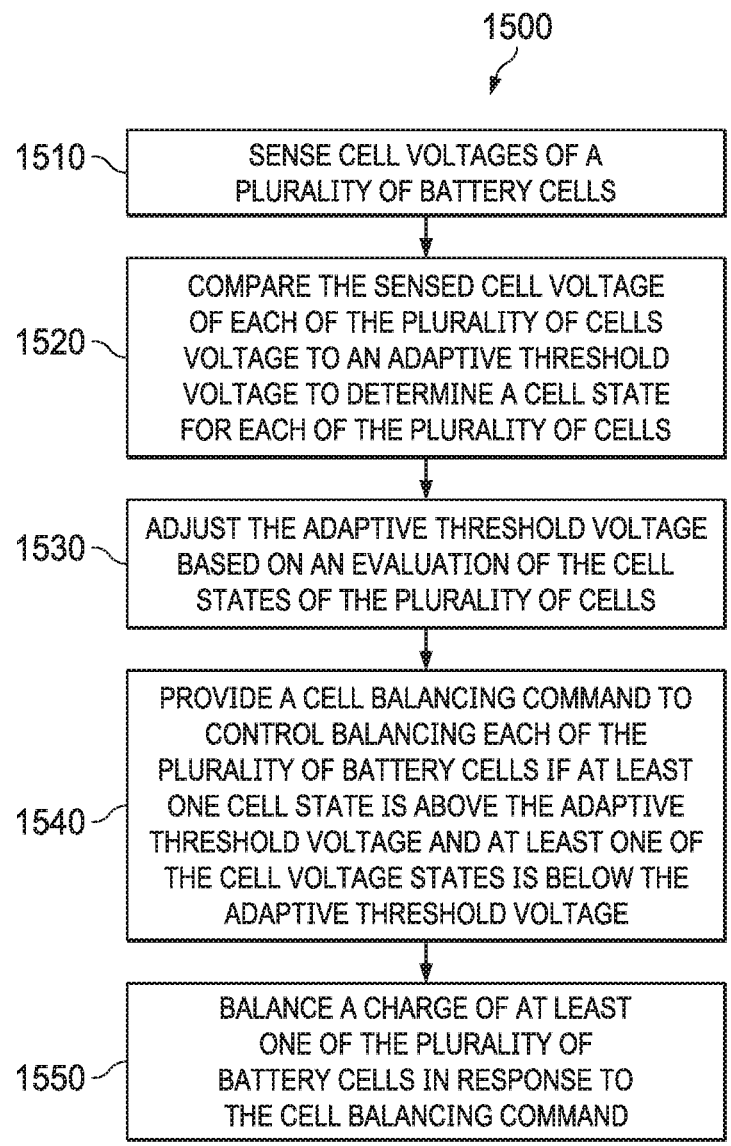
FIG. 15 illustrates an example method for adaptive cell balancing.

In view of the foregoing structural and functional features described above, example methods will be better appreciated with reference to FIGS. 13, 14, and 15. While, for purposes of simplicity of explanation, the methods are shown and described as executing serially, it is to be understood and appreciated that the methods are not limited by the illustrated order, as parts of the methods could occur in different orders and/or concurrently from that shown and described herein. Such methods can be executed by various hardware circuits, such as including those disclosed herein, for example.

FIG. 13 illustrates an example method 1300 for single adaptive threshold voltage cell-balancing. With respect to the method 1300, cell balancing is performed by considering a single adaptive voltage threshold value, the cell balancing threshold (CBT). Initially, the CBT applies a VSTART voltage value which is the lowest/minimum possible value of CBT. All the cell voltages are compared with reference to the CBT individually, and, a distribution of all the cell voltages with respect to CBT is arrived at. If there is at least one cell positioned below the CBT, then, cell balancing is turned on for all the cells positioned above CBT. When there is a distribution of cell voltages where all the cell voltages are greater than the CBT, then CBT is incremented by a STEP voltage value (e.g., 50 mV). The CBT will not be incremented beyond the final charge voltage (VFC) voltage value and will be clamped at the VFC value (maximum cell voltage), if the incremented CBT value goes above VFC. When, there is a distribution of cell voltages, where all the cell voltages are less than the CBT, the CBT is decremented by the STEP value. The CBT will not be decremented below the VSTART voltage value and will be clamped at the VSTART value, if the decremented CBT value goes below VSTART.

The method 1300 can be implemented as a state machine or machine-readable instructions of a processor or controller, for example. At 1310, the method 1300 starts and proceeds to 1312 where CBT is set to VSTART. At 1314, the method 1300 makes a determination whether a given cell CV(i) is greater than CBT, where (i) is a positive integer representing the ith cell. If not, the method 1300 proceeds back to 1314. If CBT is exceeded at 1314, the method 1300 proceeds to 1318 to determine if any of the cell voltages are below CBT. If not, the method 1300 proceeds back to 1314. If any of the cell voltages are below CBT at 1318, the method 1300 proceeds to 1324. where cell balancing is turned on for the ith cell. If all the cell voltages are above CBT at 1328, cell balancing is turned off for the ith cell at 1330 and CBT is incrementally increased (e.g., +STEP) in voltage at 1334. If CBT is greater than VFC at 1340, CBT is set equal to VFC at 1344 where the method 1300 proceeds back to 1314. If all of the cell voltages are below CBT at 1350, cell balancing is turned off for the ith cell at 1354 and CBT is incrementally decreased in voltage (e.g., −STEP) at 1360. If CBT is less than VSTART at 1364, CBT is set equal to VSTART at 1370 where the method 1300 proceeds back to 1314.

FIG. 14 illustrates an example method 1400 for dual adaptive threshold voltage cell-balancing. In this method, cell balancing is performed by considering two adaptive voltage threshold values, referred to as CBT_H and the CBT_L. CBT_H and CBT_L are separated by a value of STEP volts with CBT_H being the higher voltage. Initially, the CBT_L takes the VSTART voltage value and the CBT_H takes a voltage value greater by STEP volts. All the cell voltages are compared with reference to the CBT_H and CBT_L individually, and, a distribution of all the cell voltages with respect to CBT_H and CBT_L is arrived at. If there is at least one cell positioned below the CBT_L, then, cell balancing is turned on for all the cells positioned above CBT_H. Whenever there is a distribution of cell voltages where all the cell voltages are greater than the CBT_H, the CBT_H and CBT_L threshold values are incremented by the STEP value. The CBT_H will not be incremented beyond the VFC voltage value and will be clamped at the VFC value, if the incremented CBT_H value goes above VFC. When there is a distribution of cell voltages, where all the cell voltages are lesser than the CBT_L, the CBT_H and CBT_L threshold values are decremented by the STEP value. The CBT_L will not be decremented below the VSTART voltage value and will be clamped at the VSTART value, if the decremented CBT_L value goes below VSTART.

The method 1400 can also be implemented as a state machine or machine-readable instructions of a processor or controller, for example. At 1410, the method 1400 starts and proceeds to 1412 where CBT_L is set to VSTART and CBT_H is set to CBT_L plus STEP. At 1414, the method 1400 makes a determination whether a given cell CV(i) is greater than CBT_H, where (i) is an integer representing the ith cell. If not, the method 1400 proceeds back to 1414. If CBT_H is exceeded at 1414, the method 1400 proceeds to 1418 to determine if any of the cell voltages are below CBT_L. If not, the method 1400 proceeds back to 1414. If any of the cell voltages are below CBT_L at 1418, the method 1400 proceeds to 1424 where cell balancing is turned on for the ith cell. If all the cell voltages are above CBT_L at 1428, cell balancing is turned off for the ith cell at 1430 and CBT_H is incrementally increased (e.g., +STEP) in voltage at 1434. If CBT_H is greater than VFC at 1440, CBT_H is set equal to VFC at 1444 where the method 1400 proceeds back to 1414. If all of the cell voltages are below CBT_H at 1450, cell balancing is turned off for the ith cell at 1454 and CBT_L is incrementally decreased in voltage (e.g., −STEP) at 1460. If CBT_L is less than VSTART at 1464, CBT_L is set equal to VSTART at 1470 and CBT_H is set equal to CBT_L+ STEP, where the method 1400 proceeds back to 1414.

FIG. 15 illustrates an example method 1500 for adaptive cell balancing. At 1510, the method 1500 includes sensing cell voltages of a plurality of battery cells. At 1520, the method 1500 includes comparing the sensed cell voltage of each of the plurality of cells to an adaptive threshold voltage to determine a cell state for each of the plurality of cells. At 1530, the method 1500 includes adjusting the adaptive threshold voltage based on an evaluation of the cell states of the plurality of cells. At 1540, the method 1500 includes providing a cell balancing command to control balancing each of the plurality of battery cells if at least one cell state is above the adaptive threshold voltage and at least one of the cell voltage states is below the adaptive threshold voltage. At 1550, the method 1500 includes balancing a charge of at least one of the plurality of battery cells in response to the cell balancing command. The adaptive threshold voltage can include first and second threshold voltages separated from each other by a window voltage. Although not shown, the method 1500 can also include comparing the cell voltage for each of the plurality of cells to the first threshold to determine a first cell state for each respective cell. This can include comparing to the second threshold voltage to determine a second cell state for each respective cell. The method may also include providing the cell balancing command for each respective battery cell based on the first and second cell states thereof. One of the first and second threshold voltages further may be incremented based on an evaluation of the cell states, and depending on which threshold voltages is incremented or decremented, such as disclosed herein, the other threshold is also adjusted to maintain the predetermined window voltage between the thresholds.

What have been described above are examples. It is, of course, not possible to describe every conceivable combination of components or methods, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. Additionally, where the disclosure or claims recite "a," "an," "a first," or "another" element, or the equivalent thereof, it should be interpreted to include one or more than one such element, neither requiring nor excluding two or more such elements.

What is claimed is:

1. A cell balancing system, comprising:
   sensing circuitry configured to sense a cell voltage of each of a plurality of cells of a battery;
   a comparison circuit configured to compare the sensed cell voltages for each of the plurality of cells to an adaptive threshold voltage, the comparison circuit generates a respective cell state for each of the plurality of cells to indicate a state of the respective cell voltage for each of the plurality of cells relative to the adaptive threshold voltage; and
   a controller configured to set a respective cell balancing command for each of the plurality of cells and to adjust the adaptive threshold voltage based on an evaluation of the respective cell states for the plurality of cells.

2. The cell balancing system of claim 1, further comprising:
   cell balancing circuitry configured to balance each of the plurality of cells in response to the respective cell balancing command for each of the plurality of cells,
   wherein the controller is configured to set the respective cell balancing command to activate cell balancing for a given cell of the plurality of cells based on the cell state for the given cell and the cell state of at least one other of the plurality of cells.

3. The cell balancing system of claim 2, wherein the controller is configured to set the respective cell balancing command to deactivate cell balancing for a given cell of the plurality of cells based on the cell state of each of the plurality of cells.

4. The cell balancing system of claim 2, wherein the controller is configured to set the respective cell balancing command to activate cell balancing for each cell above the adaptive threshold voltage if at least one of the cell states indicates at least one cell voltage is below the adaptive threshold voltage.

5. The cell balancing system of claim 4, wherein the controller is configured to increase the adaptive threshold voltage if the cell states indicate that each cell voltage is above the adaptive threshold voltage.

6. The cell balancing system of claim 5, wherein the controller is configured to increase the adaptive threshold voltage in incremental voltage steps up to a predetermined maximum voltage for each cell if all cell states indicate each cell voltage is above the adaptive threshold voltage.

7. The cell balancing system of claim 4, wherein the controller is configured to decrease the adaptive threshold voltage in decremental voltage steps down to a predetermined minimum voltage for each cell if all cell states indicate each cell voltage is below the adaptive threshold voltage.

8. The cell balancing system of claim 1, wherein the adaptive threshold voltage includes first and second adaptive threshold voltages separated from each other by a window voltage, the cell voltage for each of the plurality of cells is compared to the first adaptive threshold voltage to determine a first cell state for each respective cell and compared to the second adaptive threshold voltage to determine a second cell state for each respective cell.

9. The cell balancing system of claim 8, wherein the controller is configured to enable cell balancing for at least one cell in response to the first cell state for at least one cell indicating that a cell voltage for the at least one cell is above the first adaptive threshold voltage and the second cell state for at least another cell indicating that the cell voltage for the at least another cell for the plurality of cells is below the second adaptive threshold voltage.

10. The cell balancing system of claim 8, wherein the controller is configured to increment each of the first and second adaptive threshold voltages by a step voltage if each of the cell states for the plurality of cells indicates each of the cells is above the first adaptive threshold voltage, or
    wherein the controller is configured to decrement each of the first and second adaptive threshold voltages by the step voltage if each of the cell states for the plurality of cells indicates each of the cells is below the second adaptive threshold voltage, such that the window voltage is maintained between the first and second adaptive threshold voltages.

11. The cell balancing system of claim 10, wherein the step voltage is programmable.

12. The cell balancing system of claim 10, wherein the step voltage is set equal to the window voltage.

13. A battery protector device, comprising:
    a multiplexer connected to cell input/output (I/O) terminals, the cell I/O terminals coupled to cell voltages from a plurality of battery cells, the multiplexer provides an output voltage corresponding to a selected cell voltage based on a multiplexer input signal;
    a comparator coupled to the output voltage of the multiplexer and an adaptive threshold voltage, the comparator provides cell states of the cell voltages based on a comparison of the output voltage, corresponding to the selected cell voltage, to the adaptive threshold voltage; and
    a controller configured to adjust the adaptive threshold voltage based on the cell states of the cell voltages, the controller configured to set a cell balancing command to balance the plurality of battery cells if at least one cell state indicates a respective cell voltage is above the adaptive threshold voltage and at least one other of the cell states indicates that a respective cell voltage is below the adaptive threshold voltage.

14. The battery protector device of claim 13, wherein the controller is configured to increase the adaptive threshold voltage in incremental voltage steps up to a predetermined maximum voltage for each cell if all cell states indicate each cell is above the adaptive threshold voltage, or the controller is configured to decrease the adaptive threshold voltage in incremental voltage steps up to a predetermined minimum voltage for each cell if all cell states indicate each cell is below the adaptive threshold voltage.

15. The battery protector device of claim 13, wherein the adaptive threshold voltage includes first and second adaptive threshold voltages separated from each other by a window voltage, the cell voltage for each of the plurality of battery cells is compared to the first adaptive threshold voltage to determine a first cell state for each respective cell and compared to the second adaptive threshold voltage to determine a second cell state for each respective cell, the controller providing the cell balancing command for each respective cell based on the first and second cell states thereof.

16. A method, comprising:
sensing cell voltages of a plurality of battery cells;
comparing the sensed cell voltage of each of the plurality of battery cells to an adaptive threshold voltage to determine a cell state for each of the plurality of battery cells;
adjusting the adaptive threshold voltage based on an evaluation of the cell states of the plurality of battery cells; and
providing a cell balancing command to control balancing each of the plurality of battery cells if at least one cell state is above the adaptive threshold voltage and at least one of the cell states indicates the cell voltage is below the adaptive threshold voltage.

17. The method of claim 16, wherein the adaptive threshold voltage includes first and second adaptive threshold voltages separated from each other by a window voltage.

* * * * *